US008972550B2

(12) United States Patent
Fan et al.

(10) Patent No.: US 8,972,550 B2
(45) Date of Patent: Mar. 3, 2015

(54) APPARATUS AND METHOD FOR ESTABLISHING COMMUNICATIONS

(75) Inventors: James Fan, San Ramon, CA (US);
Lipton Chin-Loy, Duluth, GA (US);
Richard Kuo, Mountain View, CA (US);
Jennifer Lam, Fremont, CA (US);
Chandrasekaran Sundaramurthy,
Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 29 days.

(21) Appl. No.: 12/557,236

(22) Filed: Sep. 10, 2009

(65) Prior Publication Data

US 2011/0066875 A1   Mar. 17, 2011

(51) Int. Cl.

| | |
|---|---|
| *G06F 15/173* | (2006.01) |
| *G06F 15/16* | (2006.01) |
| *G06F 11/20* | (2006.01) |
| *H04L 12/28* | (2006.01) |
| *H04L 12/54* | (2013.01) |
| *H04L 12/24* | (2006.01) |
| *H04L 12/801* | (2013.01) |
| *H04L 12/911* | (2013.01) |

(52) U.S. Cl.
CPC ........ *G06F 11/2028* (2013.01); *H04L 12/2898* (2013.01); *H04L 12/5691* (2013.01); *H04L 41/0668* (2013.01); *H04L 47/10* (2013.01); *H04L 47/746* (2013.01); *G06F 11/2035* (2013.01)
USPC ........... 709/223; 709/224; 709/225; 709/238; 709/239; 709/249; 709/250

(58) Field of Classification Search
CPC ......... H04L 45/28; H04L 45/22; H04L 69/40; H04W 40/00
USPC .................. 709/223–225, 238–239, 249–250
See application file for complete search history.

(56) References Cited

U.S. PATENT DOCUMENTS

| | | | | |
|---|---|---|---|---|
| 6,047,322 | A  * | 4/2000 | Vaid et al. ..................... | 709/224 |
| 6,173,322 | B1 * | 1/2001 | Hu ................................ | 709/224 |
| 6,292,905 | B1 * | 9/2001 | Wallach et al. .............. | 714/4.12 |
| 7,171,467 | B2 * | 1/2007 | Carley .......................... | 709/224 |
| 7,362,709 | B1 * | 4/2008 | Hui et al. ...................... | 370/237 |
| 7,583,677 | B1 * | 9/2009 | Ma et al. .................. | 370/395.21 |
| 7,647,422 | B2 * | 1/2010 | Singh et al. .................. | 709/238 |

(Continued)

OTHER PUBLICATIONS

Sung et al., "IPsec-based VoIP Performance in WLAN environments", Internet Computing IEEE, Nov. 11, 2008, vol. 12 Issue 6, p. 77-82, ISSN 1089-7801.*

(Continued)

*Primary Examiner* — Edward Kim
(74) *Attorney, Agent, or Firm* — Guntin & Gust, PLC; Douglas Schnabel

(57) ABSTRACT

A system that incorporates teachings of the present disclosure may include, for example, a gateway comprising a controller to transport media data between a service provider network and one or more end user devices associated with the gateway, and transmit connection signals to a second gateway for establishing communications between the service provider network and the gateway and for establishing a plurality of queues at the second gateway, where the queues are dedicated to each of femtocell, internet and VoIP services associated with the gateway. Other embodiments are disclosed.

16 Claims, 8 Drawing Sheets

(56) References Cited

U.S. PATENT DOCUMENTS

| | | | |
|---|---|---|---|
| 7,729,366 B2* | 6/2010 | Mok et al. | 370/401 |
| 7,813,265 B2* | 10/2010 | Patel et al. | 370/217 |
| 2001/0039574 A1* | 11/2001 | Cowan et al. | 709/223 |
| 2002/0120744 A1* | 8/2002 | Chellis et al. | 709/226 |
| 2003/0065712 A1* | 4/2003 | Cheung et al. | 709/203 |
| 2003/0088698 A1* | 5/2003 | Singh et al. | 709/239 |
| 2004/0078450 A1* | 4/2004 | Chen et al. | 709/214 |
| 2005/0066060 A1* | 3/2005 | Pinkerton et al. | 709/249 |
| 2005/0228879 A1* | 10/2005 | Cherkasova et al. | 709/224 |
| 2007/0214280 A1* | 9/2007 | Patel et al. | 709/239 |
| 2008/0052401 A1* | 2/2008 | Bugenhagen et al. | 709/227 |
| 2008/0177767 A1* | 7/2008 | Lin et al. | 707/100 |
| 2008/0183891 A1* | 7/2008 | Ni et al. | 709/239 |
| 2009/0092133 A1* | 4/2009 | Mok et al. | 370/389 |
| 2010/0009676 A1* | 1/2010 | Cormier et al. | 455/426.1 |

OTHER PUBLICATIONS

"Netgear Launches Femtocell Gateway", Feb. 6, 2008, http://www.inc.com/news/articles/2008/02/06netgear.html.*

* cited by examiner

300

US 8,972,550 B2

APPARATUS AND METHOD FOR ESTABLISHING COMMUNICATIONS

FIELD OF THE DISCLOSURE

The present disclosure relates generally to communication systems and more specifically to an apparatus and method for establishing communications.

BACKGROUND

Service providers often provide a plurality of communication services to users, including voice, video and data services. These services can be routed through common devices which can create servicing difficulties when the common devices are not functioning properly.

DETAILED DESCRIPTION

One embodiment of the present disclosure can entail a computer-readable storage medium comprising computer instructions to detect a connection failure between the first gateway and a service provider network where the first gateway is operable to transport voice, video and data communications between the service provider network and one or more end user devices associated with the first gateway, determine one or more second gateways in communication with the first gateway, determine a resource capacity of the second gateways, select at least one of the second gateways that satisfies a threshold associated with the resource capacity, transmit connection signals to the selected second gateway for establishing communications between the service provider network and the first gateway and for establishing a plurality of queues at the selected second gateway where the queues are dedicated to each of femtocell, internet and VoIP services associated with the first gateway.

Another embodiment of the present disclosure can entail a gateway having a controller to transport media data between a service provider network and one or more end user devices associated with the gateway, and transmit connection signals to a second gateway for establishing communications between the service provider network and the gateway and for establishing a plurality of queues at the second gateway where the queues are dedicated to each of femtocell, internet and VoIP services associated with the gateway.

Yet another embodiment of the present disclosure can entail a method including detecting an undesired condition between a first gateway and a service provider network where the first gateway is operable to transport media communications between the service provider network and one or more first end user devices associated with the first gateway, and transmitting connection signals to a second gateway for establishing communications between the service provider network and the first gateway and for establishing a plurality of queues at the second gateway where the queues are dedicated to each of femtocell, internet and VoIP services associated with the first gateway.

Figure 1:
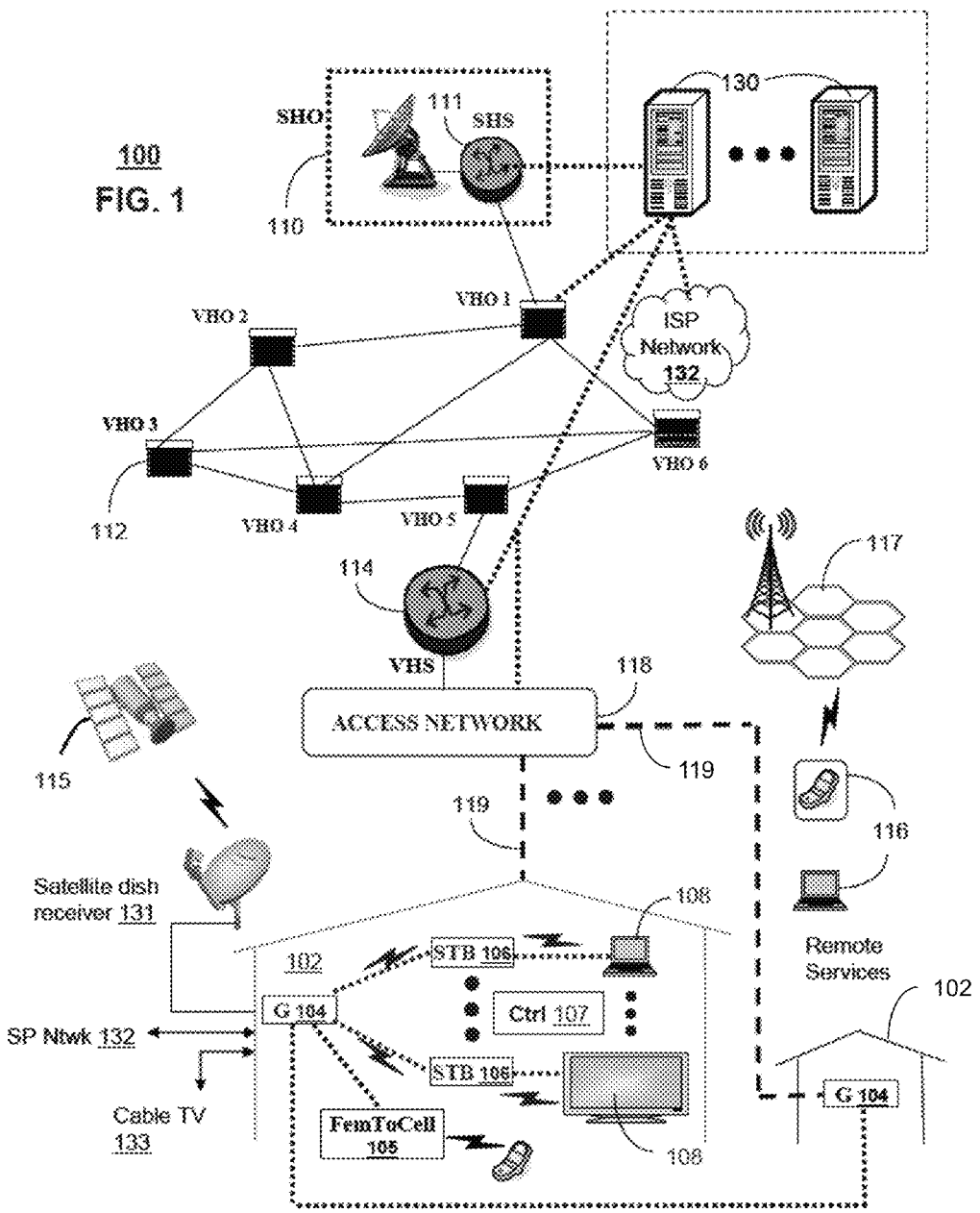
FIG. 1 depicts an illustrative embodiment of a communication system that provides media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

In one embodiment, the gateways 104 of distinct users can be in communication with each other and can facilitate communications between the Service Provider and one or more gateways that are experiencing problems or are experiencing other undesired conditions, such as traffic capacity. It follows from the above illustrations that the present disclosure can apply to any present or future interactive media content services.

In another embodiment, gateway 104 can connect the residence 102 to the Service Provider's Wide Area Network (WAN) and a tunnel can be established via the gateway to the WAN and then to the wireless switching center. In one embodiment, generic routing encapsulation can be utilized to establish the tunnel for the femtocell service. However, the present disclosure contemplates the use of other tunneling techniques to provide secure communications. In another embodiment, multiple tunnels can be established for the femtocell service, including establishing a pair of unidirectional tunnels (including through use of different neighboring gateways) to implement the femtocell service.

A femtocell device 105, such as an access point base station or cellular base station can connect to the service provider's network via broadband, such as DSL or cable, which allows for support of a number of active mobile phones in a residential (or commercial) setting. A femtocell device 105 allows service providers to extend service coverage indoors, especially where access would otherwise be limited or unavailable. In one embodiment, the femtocell device 105 can incorporate the functionality of a typical base station but extend it to allow a simpler, self contained deployment, such as a UMTS femtocell containing a Node B, RNC and GPRS Support Node (SGSN) with Ethernet for backhaul. The femtocell device 105 can use various protocols and standards including GSM, CDMA2000, TD-SCDMA and WiMAX.

Figure 2:
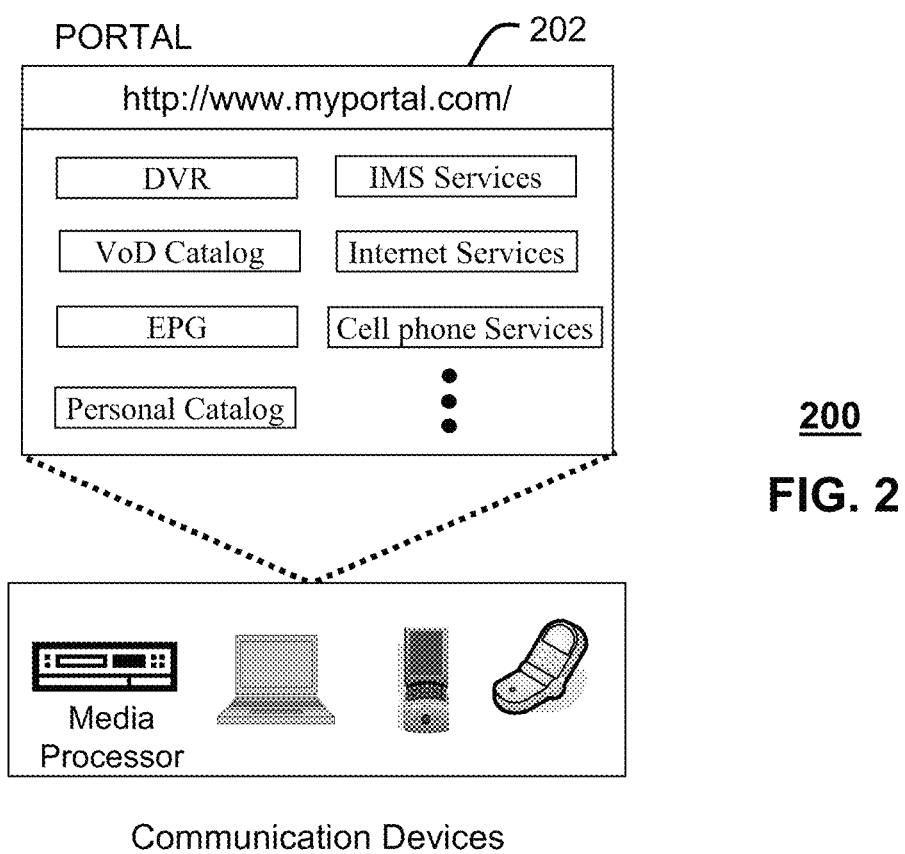
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
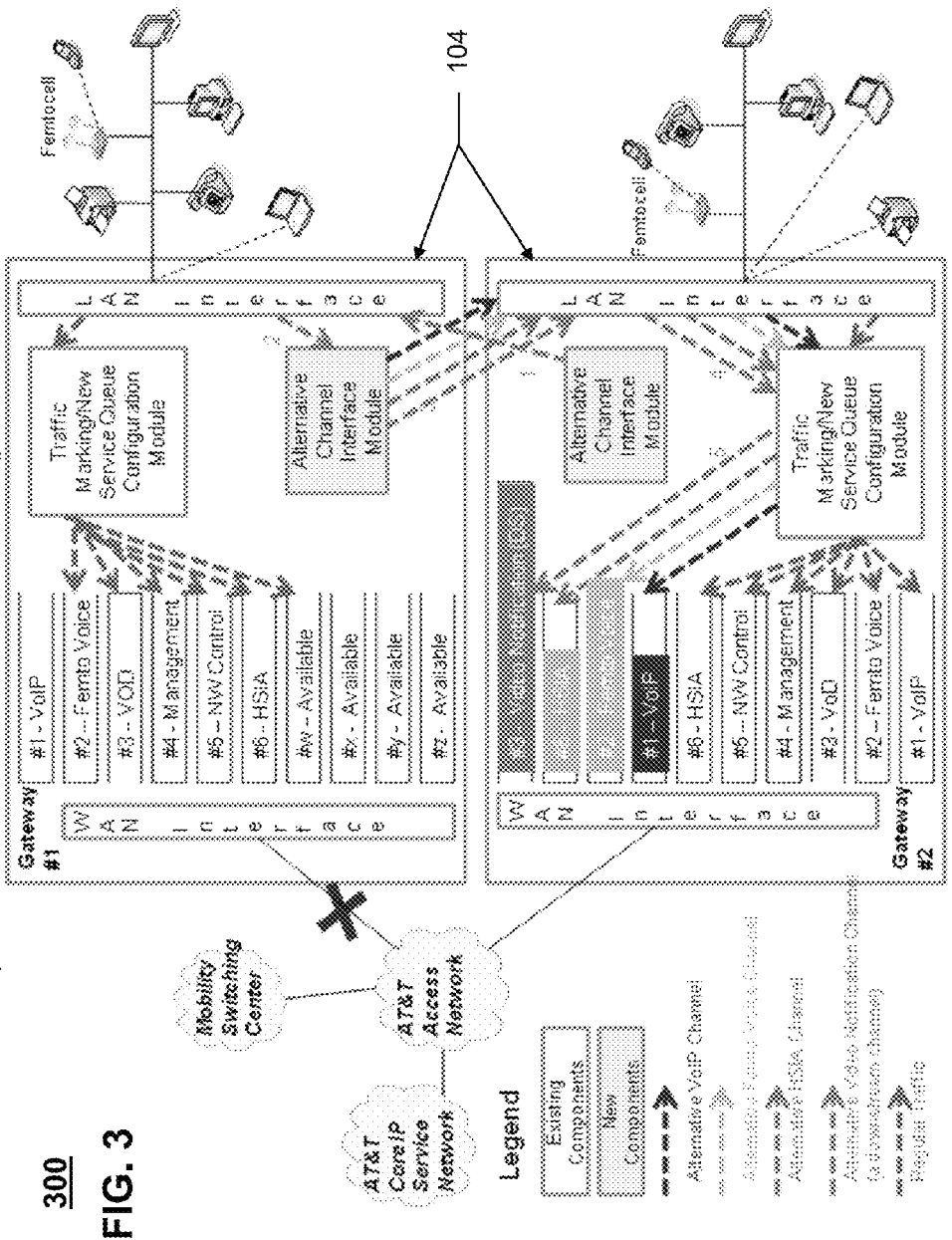
FIGS. 3-6 depict illustrative embodiments of communication system that provide media services.

FIG. 3 depicts an exemplary embodiment of a communication system 300 for delivering media content. Communication system 300 can be overlaid or operably coupled with communication system 100 as another representative embodiment of said communication systems. System 300 can include a plurality of gateways, such as residential gateways 104. The gateways 104 can be in communication with various network devices as well as various customer premises equipment for the delivery of voice, video and data services. The gateways 104 can be in communication with femtocell devices to extend mobile phone communication within residential or commercial facilities, such as through establishing a tunnel via the gateway to the service provide network. System 300 can utilize various protocols, techniques and combinations thereof for transmitting the requested media content to the gateway 104, including WiFi, WiMax, GPRS, 3G, 4G and so forth. System 300 can also utilize various protocols, techniques and combinations thereof for transmitting the requested media content to various points throughout the system, including use of an IPTV access network, the public Internet, and/or an IMS network. Delivery of the services can be to a variety of user end devices, including STB's, TV's, PCs, laptops, PDAs, mobile phones and any other device capable of receiving and presenting media content.

System 300 provides for a gateway 104 to initiate the establishment of alternative management and self-care connections to the Service Provider's network via neighboring gateway(s). System 300 also allows a network to request a neighboring gateway 104 to temporarily establish an alternative management channel on behalf of the disconnected gateway. This has a number of benefits: improve customer positive experience; improve trouble shooting effectiveness; enable self-care capability during the period of lost connectivity; and enhance robustness of 'home to WAN' network design.

The gateways 104 can comprise a number of modules that can be hardware, software or a combination of both. The gateways 104 can include a WAN interface module that enables the gateway to WAN side connection. This module can include a plurality of traffic queues (e.g., six). The queues can be used based on a priority of traffic. The gateways 104 can include a LAN Interface module that enables the gateway to LAN side of CPE connections. The gateways 104 can include a traffic marking module that will mark traffic class and place appropriate traffic class into the right priority queue.

In one embodiment, a new service queue configuration model can allow a new class of queue to be created dynamically when an alternative service channel is being established. In another embodiment, the number of queue classes in the WAN interface module can be increased, such as by four. One queue class can be configured as the alternative HSIA Service Queue to handle HSIA traffic from another Gateway. This Alternative HSIA Service Queue can have the same level of priority with the normal HSIA Queue. The second queue class can be configured as the Alternative VoIP Service Queue to handle VoIP traffic from another gateway. This Alternative VoIP Service queue can have the same priority with the normal VoIP Queue. The third queue class can be configured as the Alternative Video Notification Service Queue to forward Video Notification traffic to another gateway. The Alternative Video Notification Service Queue can have the same priority with the VoD. The fourth queue class can be configured as the Alternative FemtoVoice Service Queue to handle Femtocell traffic from another Gateway. This Alternative FemtoVoice Service Queue can have the same priority with the normal FemtoVoice queue.

The gateways 104 can further include an Alternative Service Channel Interface Module. This module can support the setup of alternative service channels via a neighboring gateway.

Figure 4:
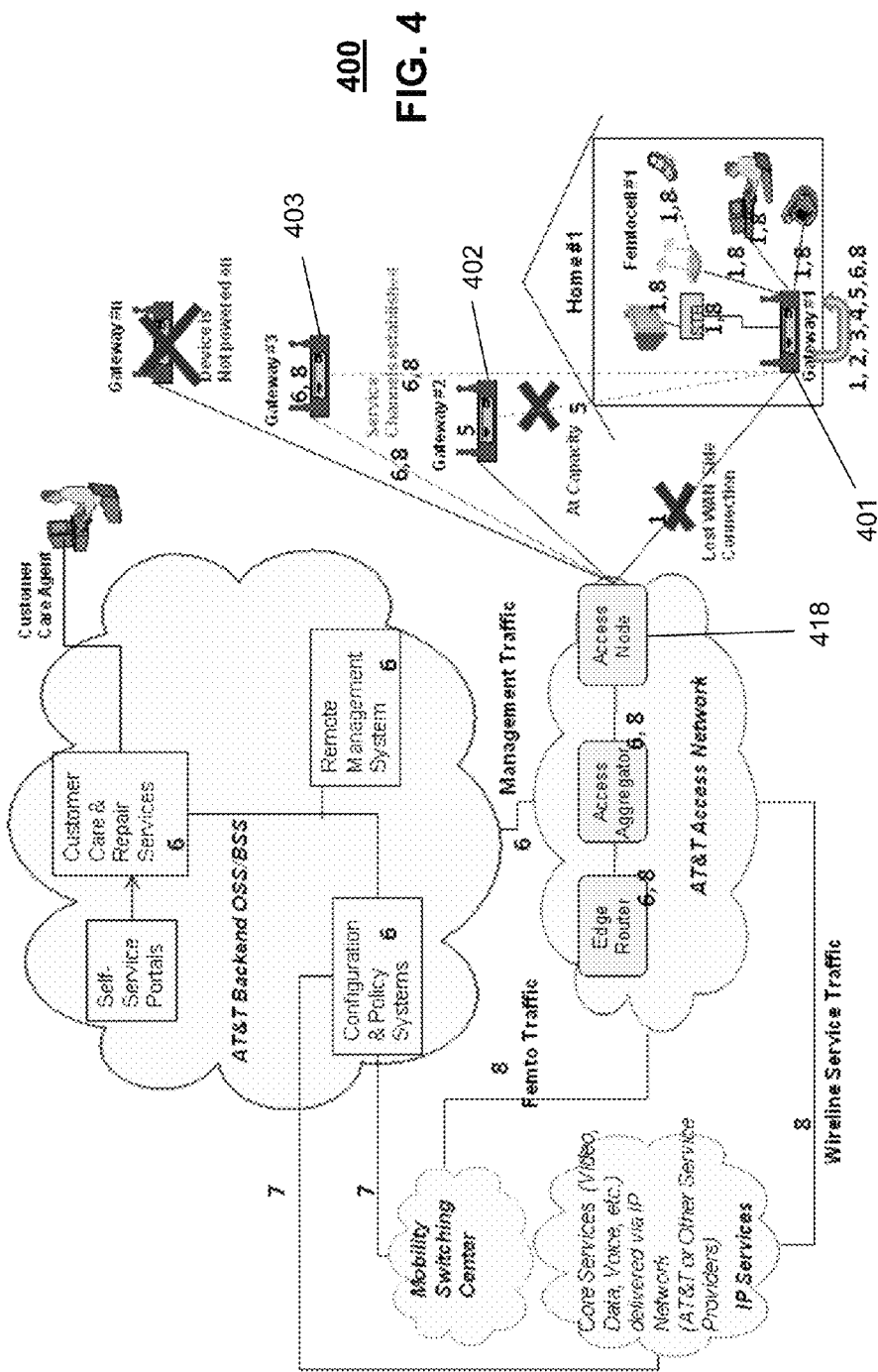

Referring additionally to FIG. 4, a communication system 400 is shown where a loss of WAN connection has been detected by the gateway. The self-healing module of the gateway can trigger a request to set up a Home to Network and Network to Home backup management channel(s) via one or more neighboring gateways. When a user attempts to solve the problem via the Internet, the gateway can establish an alternative self-care channel through the neighboring gateways.

In system 400, the connection between gateway 401 and the access node 418 is down. A Self-Healing Module in gateway 401 can execute the diagnostic routines but may still fail to re-establish the connection. The Self-Healing Module can then request the Gateway Interface Module to detect all available neighboring gateways. In this example, only gateway 402 and gateway 403 are detected since gateway #n is now powered down.

The Gateway Interface Module can verify with its Policy Module to ensure that gateway 402 and gateway 403 have the appropriate credentials to be the host for establishing Alternative Service Channel self-care connections. Gateway 401 can attempt to connect to gateway 402 with a pair of pre-configured encryption codes. The connection may be rejected by gateway 402 if it is already at capacity.

Gateway 401 can then attempt to connect to gateway 403 with the pair of encrypted codes to progress a mutual authentication process. The gateway 401's Alternative Service Channel Interface Module can request the New Service Queue Configuration Module in gateway 403 to establish three dedicated queues, namely a HSIA queue, a Femto Queue and a VoIP queue. Once these queues are set up, gateway 401's service traffic can be totally separated from gateway 403's native traffic.

Traffic marking and routing policies can be configured in upstream access node, aggregation node and edge router if needed. Remote Management System, Configuration & Policy Systems and Customer Care & Repair Service System can be updated with the new service channel information. The Configuration & Policy Systems can change the configuration and device addresses (if needed) in the IP Service Platform and Mobility Switching Node. The HSIA, VoIP and Femtocell services can be routed to gateway 401 through the Alternative Service Channels.

Figure 5:
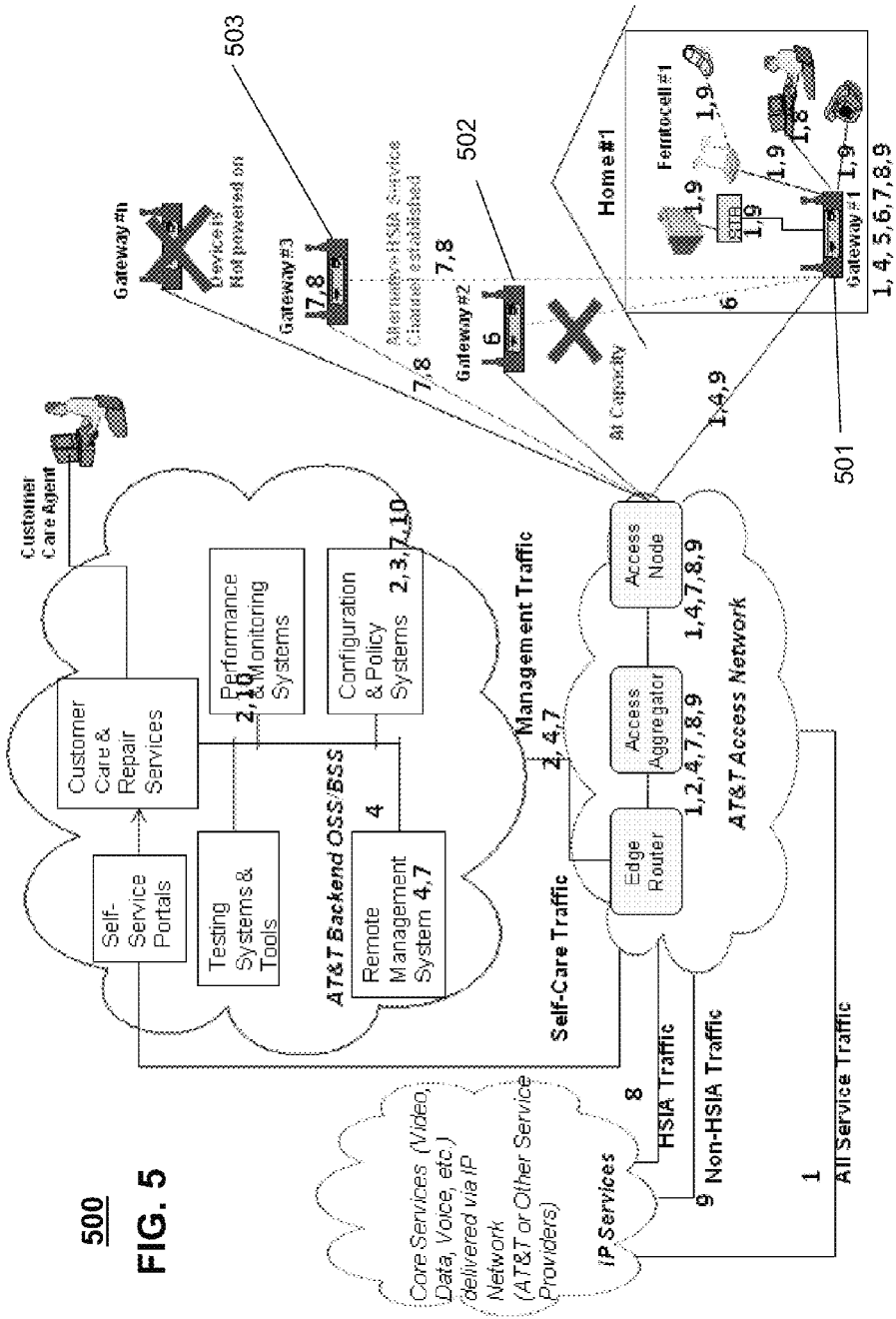

Referring to FIG. 5, a communication system 500 is shown where the peak upstream or downstream traffic load between a gateway and WAN connection is detected. The policy management system can initiate a request to set up an alternative High Speed Internet Access (HSIA) service channel through a neighboring gateway to carry all Best Effort Class Internet traffic.

In system 500, the user can be receiving various services delivered from the Core Services IP network to gateway 501. The access aggregator can detect the logical port serving gateway 501 is at peak capacity and the Best Effort Class Internet traffic is being delayed. An alert can be delivered to the Performance & Monitoring Systems through the edge router. A notification message can be sent to the Configuration & Policy Management Systems through the edge router.

The Configuration & Policy Management Systems can determine that an Alternative HSIA Service Channel will need to be set up to divert gateway 501 Internet traffic. The Configuration & Policy Management Systems can request Remote Management System to order gateway 501 to set up an Alternative HSIA Service Channel. Gateway 501 can detect the accessibility of gateway 502 and gateway 503.

Gateway 501 can attempt to connect to gateway 502 with a pre-configured pair of encrypted codes. The LAN Interface Module of gateway 502 can consult with its Configuration, Security & Policy Module, but may find that gateway 502 is already at capacity, in which case the connection request may be rejected. Gateway 501 can attempt to connect to gateway 503 with the pair of encrypted codes to progress a mutual authentication process. If the connection is accepted, the HSIA service channel can be established. Gateway 501's HSIA service traffic can be totally separated from gateway 503's native traffic. A separate queue can be used to carry this HSIA traffic. Traffic marking and routing policies can be configured in upstream access node, aggregation node and edge router. Remote Management System, Configuration & Policy System and Customer Care & Repair Service System can be updated with the new HSIA service channel information.

Gateway 501's HSIA traffic can now be routed through gateway 503's WAN connection via a different virtual channel totally separated gateway 503's native traffic. Gateway 501's HSIA service traffic can continue to go through the original path. Configuration & Policy Management Systems can send a message to notify the Monitoring & Performance Systems that gateway 501's HSIA traffic has been rerouted through gateway 503.

Figure 6:
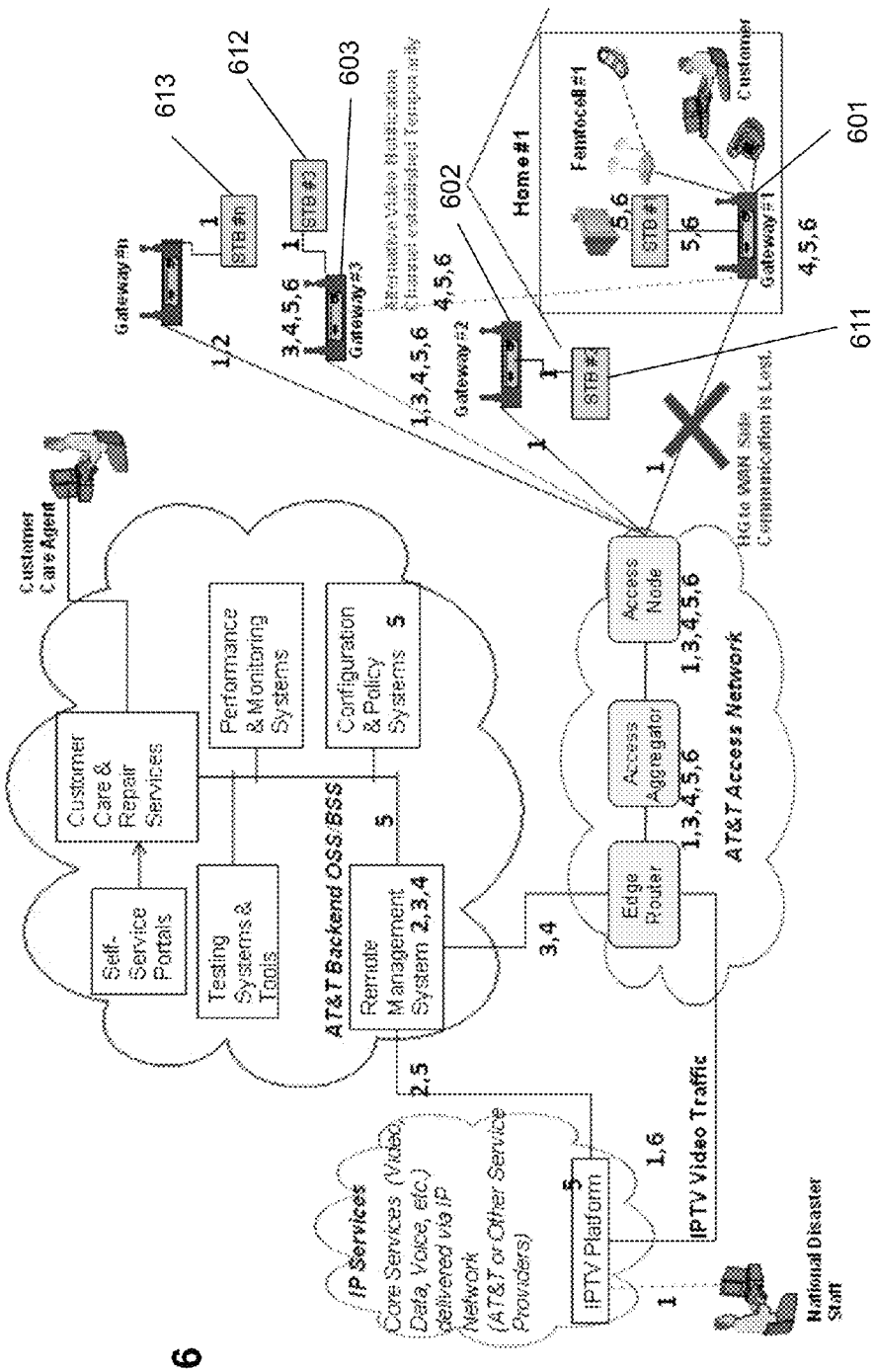

Referring to FIG. 6, a communication system 600 is shown where the gateway 601 is temporarily disconnected (but still fully functioning) from the WAN, such as a cable being unplugged. In system 600, the network can initiate a request to a neighboring gateway to establish an Alternative Video Notification Service Channel on behalf of the gateway so that urgent notification message can be delivered to the Set-Top Box or other media device connected thereto.

In system 600, an emergency alert notification is to be transmitted, such as the National Disaster Center advising all IPTV channels to broadcast a tornado warning to gateway 601's region. This disaster warning notification message is being sent to gateway 601, gateway 602, gateway 603 and gateway #n. In this example, the message has been successfully delivered to STB 612, STB 613 and STB #n. The message fails to be delivered to STB 611 since the communication link between WAN and gateway 601 is lost.

The IPTV Platform can notify the Remote Management System that gateway 601 did not receive the disaster notification. The Remote Management System can decide to setup a network initiated Alternative Video Notification Service Channel for gateway 601. The Remote Management System can locate gateway 601's alternative channel profile and can detect that gateway 603 was the gateway that had an alternative channel established on a previous occasion. The Remote Management System can access gateway 603 to assess its current traffic status.

The Remote Management System can direct gateway 603 to setup a temporary Alternative Video Notification Service Channel on behalf of gateway 601. The routing information can be updated in the Access Aggregator and Edge Router. The Remote Management System can update the IPTV Platform with the STB address mapping information. The Remote Management System can update the Configuration & Policy Systems with the STB address mapping information. The IPTV Platform can push the disaster warning notification message to STB 611 via the Alternative Video Notification Service Channel.

Figure 7:
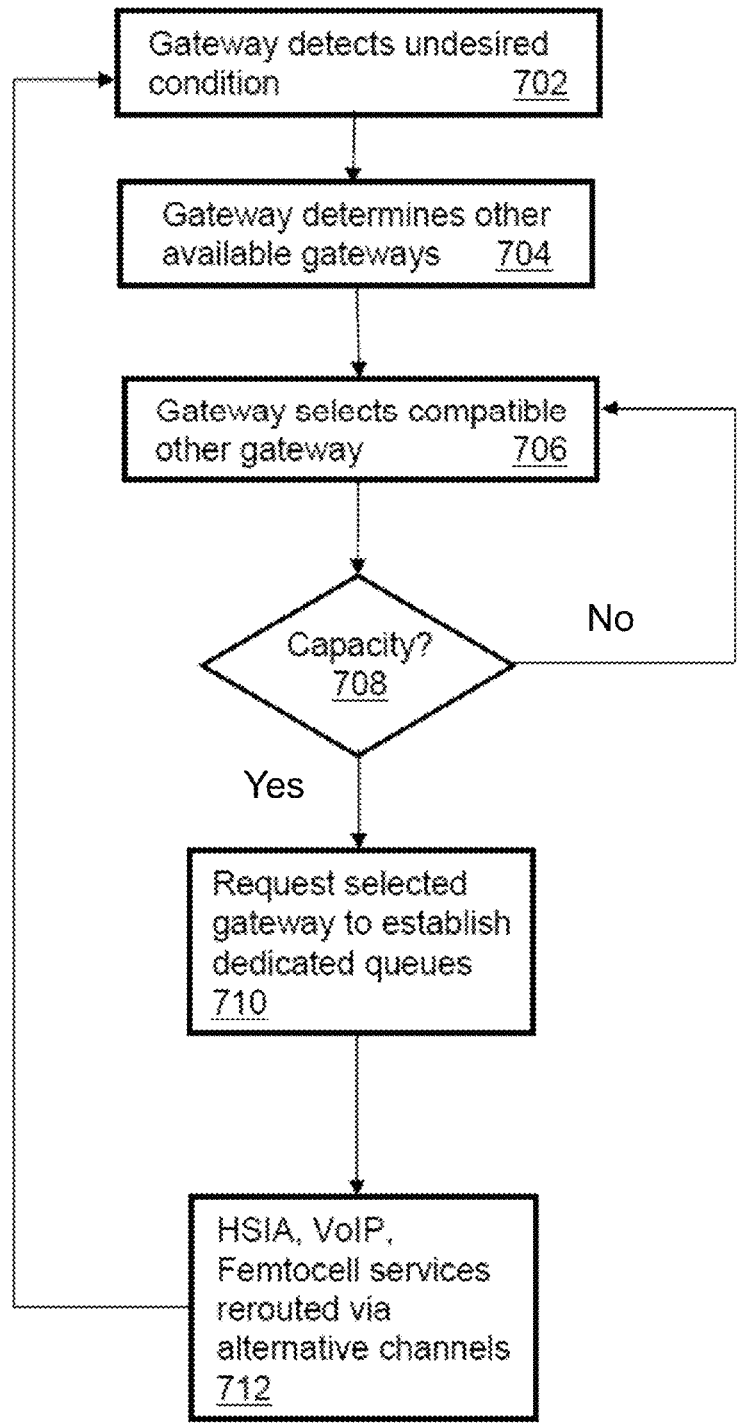
FIG. 7 depicts an illustrative embodiment of a method operating in portions of the communication systems of FIGS. 1 and 3-6.

FIG. 7 depicts an illustrative method 700 operating in portions of communication systems 100 and 300-600. Method 700 can begin with step 702 in which an undesired condition can be detected by the gateway, such as a loss of connection, latency, resource capacity threshold being reached and so forth. The condition can also be a loss of connection between the ISP WAN and the gateway, and/or a gateway component failure.

In step 704, other available gateway devices can be determined by the distressed gateway. The other gateways can be neighboring devices, such as in the same proximate location (including in the same commercial facility) or can be otherwise associated with the selected gateway. In one embodiment, the available gateways can be gateways that are associated with different users (such as from difference residences) but are available for communication with each other. In one embodiment, a database of available gateways can be maintained by the network and periodically transmitted to each of the gateways. In another embodiment, available gateway data can be maintained by each of the gateways, such as by periodically communicating with each other to maintain status information.

In step 706, one or more of the available other gateways can be selected by the distressed gateway. The selection can be made based on communication amongst the gateways, such as obtaining capability and capacity information of other available gateways. The capacity of the selected gateway can be determined in step 708 and if resources are available then the selected gateway can be utilized for establishing alternative channels (e.g., management and/or self-cure channels for the distressed gateway). In step 710, the distressed gateway can request that the selected gateway establish dedicated queues for the services that are to be rerouted through the other gateway(s). For example, dedicated queues can be established by the selected gateway for HSIA, Femto and VoIP traffic. The dedicated queues allow for the traffic associated with the distressed gateway to remain separated and isolated from the native traffic associated with the selected other gateway. In step 712, the HSIA, VoIP and Femtocell service can be rerouted via alternative channels.

Upon reviewing the aforementioned embodiments, it would be evident to an artisan with ordinary skill in the art that said embodiments can be modified, reduced, or enhanced without departing from the scope and spirit of the claims described below. For example, one or more network devices of the ISP can perform one or more of the steps described above. For instance, a network device can detect an undesired condition associated with a distressed gateway and can select other available neighboring gateways to assist in routing of traffic to the distressed gateway. In one embodiment, a network device can maintain information corresponding to available gateways and can update the information as the network topography changes.

In another embodiment, the undesired condition can be determined based on predictions made by one or both of the gateway and the ISP network devices. For example, if an ISP is installing new routers or other components that are in communication with a first gateway then the ISP may reroute some of the traffic for the first gateway through other gateways that are not relying upon the newly installed components. In this example, the ISP can then better isolate the performance of the new components by selectively monitoring various services without interrupting service to the first gateway.

Other suitable modifications can be applied to the present disclosure without departing from the scope of the claims below. Accordingly, the reader is directed to the claims section for a fuller understanding of the breadth and scope of the present disclosure.

Figure 8:
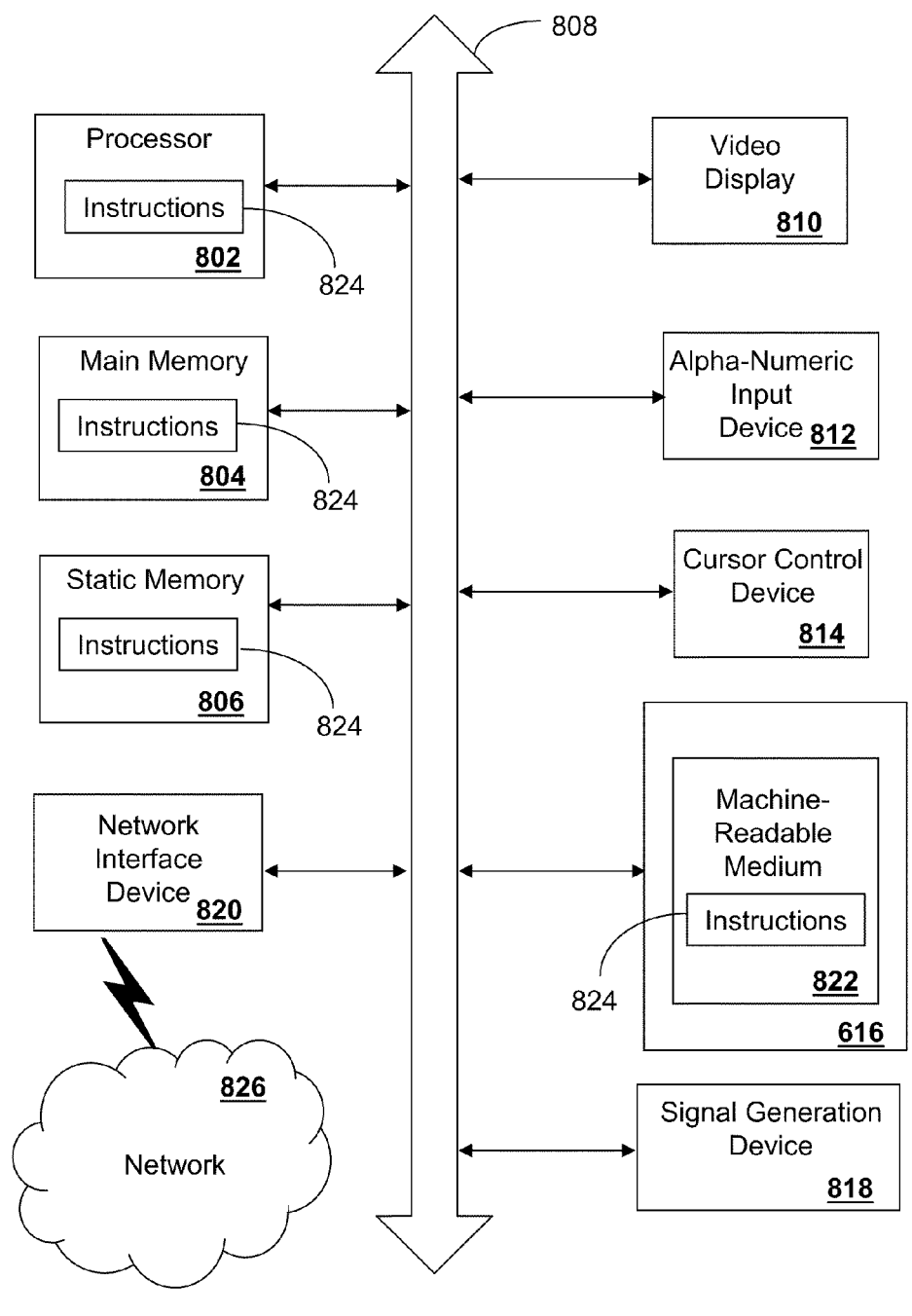
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A machine-readable storage device in a first gateway, the storage device comprising instructions which, when executed by a processor, cause the processor to perform operations comprising:
    receiving database information associated with available gateways from a service provider network;
    establishing a first connection between the first gateway and an access node for the service provider network, wherein the access node is in communication with an edge router for providing communication services;
    transporting first media data between a first end user device communicatively coupled with the first gateway and the service provider network via the first connection;
    detecting a loss of the first connection between the first gateway and the access node of the service provider network, wherein the first gateway is part of a home network;
    determining a second gateway responsive to the loss of the first connection according to the database information associated with the available gateways that is received from the service provider network, wherein the second gateway routes second media data between a second end user device communicatively coupled with the second gateway and the service provider network via a second connection between the second gateway and the access node for the service provider network;
    establishing a third connection between the first gateway and the second gateway, wherein the first media data is rerouted between the service provider network and the first end user device via a path comprising the first gateway, the second gateway, the third connection, and the second connection to the access node;
    generating a request via the service provider network to the second gateway to temporarily establish alternative service channels comprising a high-speed internet access queue, a femto-cell communication queue, and a voice over internet protocol communication queue on behalf of the first gateway responsive to detecting the loss of the first connection;
    establishing the alternative service channels responsive to the request, wherein the alternative service channels are based on internet protocol tunnels connected with the service provider network which remain separated and isolated from native traffic associated with the second gateway, wherein the first gateway and the second gateway are connected by means of a pair of encryption codes;
    routing high speed internet, femto-cell, and voice over internet protocol services between the first gateway and the service provider network through the alternative service channels of the second gateway; and
    updating customer service system information at the first gateway with new service channel information by means of the alternative service channels of the second gateway, wherein the first gateway and the second gateway are residential gateways that are each located at separate residences for providing communication services to end user devices of the separate residences.

2. The machine-readable storage device of claim 1, wherein the processor further performs operations comprising transmitting voice signals to a femtocell device.

3. The machine-readable storage device of claim 1, wherein the processor further performs operations comprising designating traffic at the first gateway for transport via a corresponding one of the alternative service channels.

4. The machine-readable storage device of claim 1, wherein the database information associated with the available gateways is received periodically from the service provider network.

5. A first gateway device, comprising:
a memory to store instructions; and
a processor coupled to the memory, wherein the processor, responsive to executing the instructions, performs operations comprising:
establishing a first connection between the first gateway device and an access node for a service provider network;
transporting first media data between a first end user device communicatively coupled with the first gateway device and a service provider network via the first connection, wherein the first gateway is part of a home network;
receiving database information associated with available gateway devices from the service provider network;
detecting a loss of the first connection between the first gateway device and the access node of the service provider network;
determining a second gateway device in communication with the first gateway device according to the database associated with the available gateway devices that is received from the service provider network responsive to the loss of the first connection, wherein the second gateway device routes second media data between a second end user device communicatively coupled with the second gateway device and the service provider network via a second connection between the second gateway device and the access node for the service provider network;
establishing a third connection between the first gateway and the second gateway, wherein the first media data is rerouted between the service provider network and the first end user device via a path comprising the first gateway device, the second gateway device, the third connection, and the second connection to the access node;
generating a request via the service provider network to the second gateway device to temporarily establish alternative service channels responsive to detecting the loss of the first connection between the first gateway and the service provider network, wherein the alternative service channels comprise a high-speed internet access queue, a femto-cell communication queue, and a voice over internet protocol communication queue;
establishing the alternative service channels responsive to the request, wherein the alternative service channels are based on internet protocol tunnels connected with the service provider network which remain separated and isolated from native traffic associated with the second gateway, wherein the first gateway and the second gateway are connected by means of a pair of encryption codes and wherein high speed internet, femto-cell, and voice over internet protocol services are routed between the first gateway and the service provider network through the alternative service channels of the second gateway; and
updating customer service system information at the first gateway with new service channel information by means of the alternative service channels of the second gateway.

6. The first gateway device of claim 5, wherein the database information associated with the available gateway devices is received periodically from the service provider network.

7. The first gateway device of claim 6, wherein the processor further performs operations comprising:
determining a resource capacity of the available gateway devices, wherein the determining of the second gateway device according to the database information associated with the available gateway devices is further based on a threshold associated with the resource capacity.

8. The first gateway device of claim 5, wherein the processor performs operations comprising designating traffic at the first gateway device for transport via the alternative service channels.

9. The first gateway device of claim 5, wherein the processor performs operations comprising transmitting voice signals to a femtocell device.

10. A method, comprising:
receiving, by a system comprising a processor, database information associated with available gateways from a service provider network;
establishing, by the system, a first connection to an access node for the service provider network;
transporting, by the system, first media data between a first end user device communicatively coupled with a first gateway and the service provider network via a first connection from the first gateway to an access node of the service provider network;
detecting, by the system, a loss of connection condition affecting communications between the first gateway and the access node of the service provider network, wherein the first gateway is part of a home network;
determining, by the system, a second gateway in communication with the first gateway according to the database information associated with the available gateways that is received from the service provider network, wherein the second gateway routes second media data between a second end user device communicatively coupled with the second gateway and the service provider network via a second connection between the second gateway and the access node for the service provider network;
establishing, by the system, a third connection between the first gateway and the second gateway, wherein the first media data is rerouted between the service provider network and the first end user device via a path comprising the first gateway, the second gateway, the third connection, and the second connection to the access node;
generating, by the system, a request via the service provider network to the second gateway to temporarily establish alternative service channels comprising a high-speed internet access queue, a femto-cell communication queue, and a voice over internet protocol communication queue on behalf of the first gateway responsive to detecting the loss of connection condition;
establishing, by the system, the alternative service channels responsive to the request, wherein the alternative service channels are based on internet protocol tunnels connected with the service provider network which remain separated and isolated from native traffic associated with the second gateway, wherein the first gateway and the second gateway are connected by means of a pair of encryption codes;

routing, by the system, high speed internet, femto-cell, and voice over internet protocol services between the first gateway and the service provider network through the alternative service channels of the second gateway; and updating, by the system, customer service system information at the first gateway with new service channel information by means of the alternative service channels of the second gateway.

11. The method of claim 10, further comprising transmitting, by the system, voice signals from the first gateway to a femtocell device.

12. The method of claim 10, wherein the database information associated with the available gateways is received periodically from the service provider network.

13. The method of claim 12, wherein the second gateway is further determined according to a resource capacity associated with the second gateway.

14. The method of claim 10, wherein the first gateway and the second gateway are residential gateways that are each located at a separate residence.

15. The method of claim 10, comprising communicating, by the system, over a video notification service channel that transports emergency messages associated with the first gateway.

16. The method of claim 10, wherein the loss of connection condition is associated with a resource capacity of the first gateway.

* * * * *